Jan. 19, 1965    G. STEINER ETAL    3,165,942
FLEXIBLE STEERING COLUMN
Filed Feb. 15, 1963
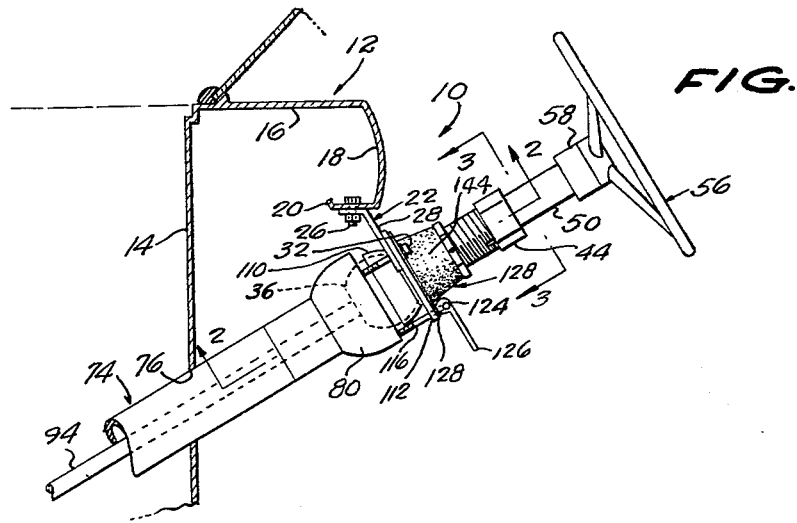
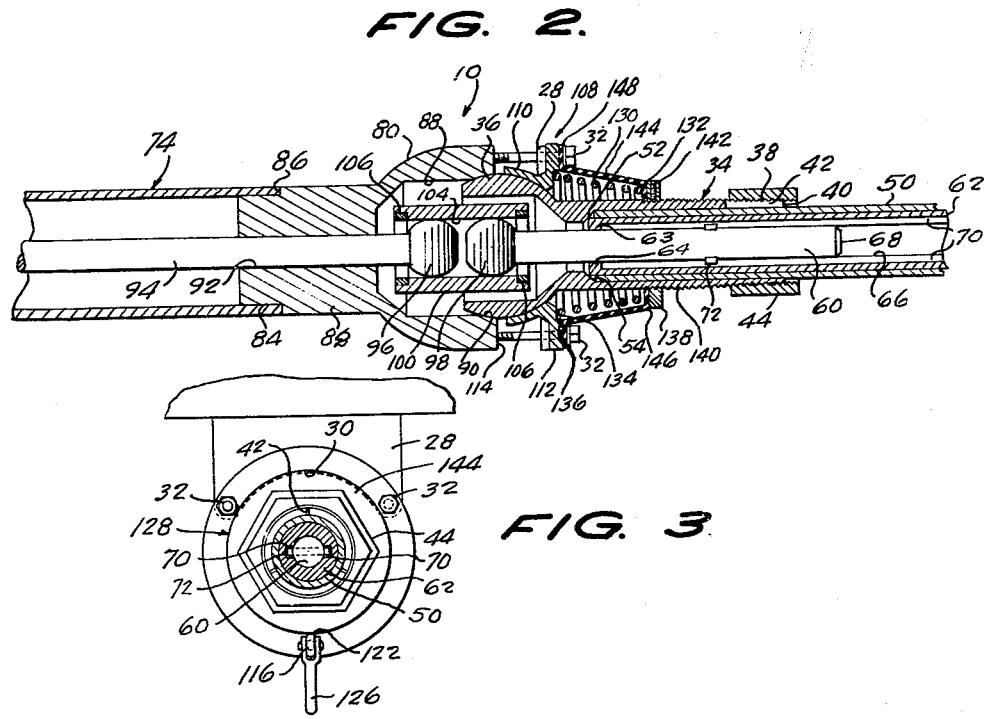
INVENTORS.
GEORGE STEINER,
JOSEPH H. DeMAIRE,
BY
McMorrow, Berman & Davidson
ATTORNEYS

United States Patent Office 3,165,942
Patented Jan. 19, 1965

3,165,942
FLEXIBLE STEERING COLUMN
George Steiner, 58531 Main Blvd., and Joseph H. De Maire, 30929 Prospect, both of New Haven, Mich., assignors of fifty percent to Frazier F. Steiner, George S. Steiner, and Nelson L. Steiner, all of New Haven, Mich.
Filed Feb. 15, 1963, Ser. No. 258,698
3 Claims. (Cl. 74—493)

This invention relates to a novel flexible steering column for the steering wheels of vehicles.

The primary object of the invention is the provision of a more practical and efficient device of the kind indicated, which incorporates spring-pressed flexible means which enables the associated steering wheel, together with an upper part of the steering column to be flexed, relative to the lower part of the steering column, so as to facilitate entry and exit of the driver of a vehicle.

Another object of the invention is the provision, in a steering column of the character indicated above, of an upper steering column part which is pivoted to the lower part of the steering column, for angular adjustments relative to the lower steering column part, which tension the spring-pressed means, and means for locking such adjustments.

A further object of the invention is the provision, in a device of the character indicated above, of a universal joint assembly, which includes a clamping or locking cap, engaged with the upper member of the assembly, the spring means being compressed between a portion of the upper steering wheel part and this cap, whereby constant engagement of the cap with this member is assured, during and after angular adjustments of the upper part of the steering column, relative to the lower part of the steering column.

Other important objects and advantageous features of the invention will be apparent from the following description and the accompanying drawings, wherein, for purposes of illustration only, a specific form of the invention is set forth in detail.

In the drawings:

FIGURE 1 is a fragmentary side elevation of a device of the present invention, mounted to a vehicle instrument panel, shown in vertical section, the upper part of the steering column being unadjusted relative to, and in line with the lower part of the steering column;

FIGURE 2 is an enlarged fragmentary horizontal section taken on the line 2—2 of FIGURE 1; and, FIGURE 3 is a vertical transverse section taken on the line 3—3 of FIGURE 1.

Referring in detail to the drawings, wherein like numerals designate like parts throughout the several views, the illustrated device, generally designated 10, is shown mounted to a vehicle instrument panel 12, the device being operatively connected to steering gear (not shown).

The instrument panel 12 is shown supported at the upper end of a perpendicular firewall 14, and comprises a rearwardly extending horizontal top wall 16, which terminates in a pendant vertical rear wall 18, having along its lower edge, a narrow, forwardly extending horizontal flange 20, which is spaced rearwardly from the firewall.

A mounting bracket 22 has a forward horizontal portion 24 which is bolted, as indicated at 26, to the underside of the instrument panel flange 20, and a rearwardly declining portion 28, provided, in its lower edge, with a clearance notch 30. Bolts 32 extend freely through the lower corners of the bracket portions 28, at the ends of the notch 30, and extend forwardly therefrom at similar downward angles.

The device 10 further comprises a tubular upper steering column section 34, which is relatively short, and has a hollow hemispherical ball 36, on its lower end, which is larger in diameter than the section 34. On the upper part of the section 34 are external screw threads 38 which extend to the upper end 40 thereof, and a longitudinal slot 42 opens to the end 40. The threaded portion 38 is upwardly tapered, and has thereon a tubular clamping nut 44, whose bore 46 is similarly tapered and provided with screw threads 48. Threading the nut 44 forwardly clamps the upper part of the section 34 on an outer steering column sleeve 50, which is slidably telescoped into the section 34, and has a lower end 52 which is adjacent to and can engage an internal annular shoulder 54, in the section 34, adjacent to the ball 36.

The outer steering column sleeve 50 is substantially longer than the section 34 and extends upwardly and rearwardly therefrom. A steering wheel 56 has a hub 58 which is circumposed on and suitably journalled on the upper end of the sleeve 50. A relatively short upper steering shaft section 60, substantially smaller in diameter than the section 34, is concentrically spaced within the sleeve 50.

An inner rotatable spline sleeve 62 is telescoped into and extends substantially the length of the outer sleeve 50, and has a lower end wall 63, which can abut the internal shoulder 54 of the section 34. The end wall 63 is formed with an axial opening 64, through which the upper shaft section 60 slides and turns. The bore 66 of the inner sleeve 62 closely receives the shaft section 60, which terminates, at its upper end, as indicated at 68, within the inner sleeve 62. The bore 66 of the inner sleeve 62 is formed with spline keyways or spline grooves 70, in which the outer ends of a diametrical key 72, extending through the shaft section 60, slides, whereby the shaft section 60 and the inner sleeve 62 are connected slidably but non-rotatably together.

The inner sleeve 62 is non-rotatably connected, in suitable manner, to the steering wheel 56. With the above described arrangement, the steering wheel 56, and hence the outer sleeve 50, to which it is connected, against endwise movements, relative to each other, can be moved endwise relative to the inner sleeve 62 and the shaft section 60, and relative to the upper steering column section 34, that is, toward and away from the driver of the vehicle, simply by loosening the clamping nut 44, moving the steering wheel to the desired adjusted position, and retightening the nut 44.

The device 10 further comprises a tubular lower steering column section 74, preferably substantially larger in diameter than the upper section 34, which extends at a forward and downward angle to the instrument panel 12 and is suitably fixed and supported through an opening 76 in the firewall 14. The lower section 74 has an enlarged diameter ball joint socket 80, fixed on its upper end, which has a shank 82 having a reduced diameter stub 84, on its forward end, which fits non-rotatably in the rear end of the section 74, and defines a shoulder 86 which bears against the upper end of the section 74. The socket 80 and its shank 82 are traversed by a longitudinal axial bore 92, which is substantially smaller in diameter than the shank 82, and rotatably receives a lower steering shaft section 94, which is suitably connected, at its lower end, to steering gear (not shown). The socket 80 has an upwardly flared concave annular portion 90, at its upper end, in which the convex lower end portion of the ball 36 conformably seats. It is to be noted that the ball joint socket 80 which is fixed on the upper end of the lower steering column section 74 and which embracingly engages the hemispherical ball 36 on the lower end of the upper steering column section 34 constitutes a universal joint which connects the upper and lower ends of the lower and upper steering column sections 74 and 34 and provides for angling of the upper column section 34 relative to the lower column section 74.

The lower steering shaft section 94 has a cube-shaped member 96 having its side faces rounded, the member 96 being fixed, on its upper end, which is located within the bore 88 of the socket 80. The member 96 is coplanar with and is longitudinally spaced from a similar member 98, fixed on the lower end of the upper shaft section 60, and these members are enclosed within a longitudinally elongated tubular housing 100, which is smaller in diameter than and concentrically spaced within the bore 102 of the ball 36. The bore 104 of the housing 100 is rectangular and conformably receives the discs 96 and 98, so as to constitute a double kneejoint. The housing 100 has retaining rings 106 inset into its forward and rear ends.

An annular bearing or clamping ring 108 has a concave skirt 110 which conformably and rotatably engages the upper part of the ball 36, in opposition to the socket portion 90. The ring 108 has a lateral annular flange 112, at its upper end, whose upper part bears against the underside of the portion 28 of the mounting bracket 22, and is fixed thereto by the bolts 32 which are threaded into the upper end 114 of the joint socket 80.

A clamping screw 116 passes freely through an opening in the lower part of the bearing ring flange 112, midway between the bolts 32, and is threaded, at its forward lower end, into the upper end 114 of the joint socket 80. An eccentric cam 122 is journalled on the upper end of the clamping screw, as indicated at 124, which bears upon the upper surface of the clamping ring flange 112, and has a lateral operating handle 126.

In operation, when the cam handle 126 is swung downwardly from the median position, shown in FIGURE 1, the cam nose 128 is retracted from the clamping ring flange 112, so that the compressive and frictional interengagements of the joint socket 80, the ball 36, and the clamping ring 108, are relaxed, so that the upper steering part section 34 can be angled relative to the lower steering column section 74. The adjustment is then locked by swinging the cam handle 126 upwardly, so that the cam nose 128 bears forcibly against the upper surface of the flange 112 of the clamping ring 108, so that the joint socket 80, ball 36, and the ring 108 are clamped together.

For the purpose of enabling the upper steering column section 34, along with the steering wheel 56 carried thereby, to be flexed out of the way by the driver of the vehicle, to facilitate entry into and exit from the vehicle, while the cam 122 is relaxed, in such manner that the upper section 34, along with the steering wheel, when released, returns to normal position, in alignment with the lower steering column section 74, a spring assembly 128 is provided, which acts between the upper section 34 and the clamping ring 108.

The spring assembly 128 comprises a coil spring 130, which concentrically surrounds the section 34, and flares downwardly from a small upper end 132, to a larger lower end 134, the latter being seated in an annular recess 136, provided in the upper surface of the clamping ring 108. A spring tensioning nut 138 is threaded, as indicated at 140, on the upper steering column section 34, and bears against the small upper end of the spring 130, for adjustably compressing the spring. A nut locking set screw 142 is threaded radially through the nut 138, against the upper section 34, for holding adjusted positions of the nut. A tapered resilient and stretchable boot 144 spacedly surrounds the spring 130 and is fixed, at its upper end, as indicated at 146, to the underside of the nut 138. The boot has a lateral flange 148 on its large lower end, which is traversed by the bolts 32, and is compressed between the heads of these bolts and the upper end of the flange 112 of the clamping ring.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:
1. A flexible steering column, comprising:
 (a) a tubular lower section containing a rotary lower steering shaft section adapted to be connected at one end to a steering gear;
 (b) a tubular upper section containing an upper rotary steering shaft section, a steering wheel rotatably carried by the upper column section and operatively connected to the upper shaft section;
 (c) a universal joint connecting the other ends of the steering column sections and providing for angling of the upper column section relative to the lower column section;
 (d) means operatively connecting together the other ends of the steering shaft sections;
 (e) spring means acting between the upper steering column section and a part of the universal joint and biasing the upper and lower column sections into alignment with each other and enabling flexing the upper column section out of alignment with the lower column section, said universal joint comprising a ball joint socket fixed on the upper end of the lower column section, a ball fixed on the adjacent end of the upper column section; said ball being abutted with and engaged in said socket, said connecting means (d) being located within the ball and the socket and comprising a housing enclosing cube-shaped members on the other ends of the steering shaft sections, each of said members having its side faces rounded, and
 (f) a locking means comprising a locking ring having a concave skirt mounting bracket, said locking ring having a concave skirt in engagement with the ball in opposition to the socket, said locking ring being freely connected to the socket at one side of the ring, and a locking member secured to the socket at the other side of the ring, and freely connected to the other side of the ring, a cam pivoted on said member and having a nose engageable with the end of the locking ring remote from the ball, and means for rotating the cam to retract its nose from the locking ring to enable the upper column section to be flexed relative to the lower column section against the resistance of said spring means (e) and to forcibly engage the cam nose with the locking ring for clamping the locking ring skirt, the ball, and the socket together to preclude flexing of the upper column section relative to the lower column section.

2. A flexible steering column, comprising:
 (a) a tubular lower section containing a rotary lower steering shaft section adapted to be connected at one end to a steering gear;
 (b) a tubular upper section containing an upper rotary steering shaft section, a steering wheel rotatably carried by the upper column section and operatively connected to the upper shaft section;
 (c) a universal joint connecting the other ends of the steering column sections and providing for angling of the upper column section relative to the lower column section;
 (d) means operatively connecting together the other ends of the steering shaft sections;
 (e) spring means acting between the upper steering column section and a part of the universal joint and biasing the upper and lower column sections into alignment with each other and enabling flexing the upper column section out of alignment with the lower column section, said universal joint comprising a ball joint socket fixed on the upper end of the lower column section, a ball fixed on the adjacent end of the upper column section; said ball being abutted with and engaged in said socket, said connecting means (d) being located within the ball and the socket and comprising a housing enclosing cube-shaped members on the other ends of the steering shaft sections, each of said members having its side faces rounded, and;

(f) a locking means comprising a locking ring having a concave skirt in engagement with the ball in opposition to the socket, said locking ring being freely connected to the socket at one side of the ring, and a locking member secured to the socket at the other side of the ring, and freely connected to the other side of the ring, a cam pivoted on said member and having a nose engageable with the end of the locking ring remote from the ball, and means for rotating the cam to retract its nose from the locking ring to enable the upper column section to be flexed relative to the lower column section against the resistance of said spring means (e) and to forcibly engage the cam nose with the locking ring for clamping the locking ring skirt, the ball, and the socket together to preclude flexing of the upper column section relative to the lower column section, said spring means comprising a coil spring circumposed on the upper column section, said locking ring having an annular recess facing said spring, said spring having one end seated in said recess and another end, a tension adjusting nut threaded on the upper column section and compressing the spring against the locking ring.

3. A flexible steering column, comprising:

(a) a tubular lower section containing a rotary lower steering shaft section adapted to be connected at one end to a steering gear;

(b) a tubular upper section containing an upper rotary steering shaft section, a steering wheel rotatably carried by the upper column section and operatively connected to the upper shaft section;

(c) a universal joint connecting the other ends of the steering column sections and providing for angling of the upper column section relative to the lower column section;

(d) means operatively connecting together the other ends of the steering shaft sections;

(e) spring means acting between the upper steering column section and a part of the universal joint and biasing the upper and lower column sections into alignment with each other and enabling flexing the upper column section out of alignment with the lower column section, said universal joint comprising a ball joint socket fixed on the upper end of the lower column section, a ball fixed on the adjacent end of the upper column section; said ball being abutted with and engaged in said socket, said connecting means (d) being located within the ball and the socket and comprising a housing enclosing cube-shaped members on the other ends of the steering shaft sections, each of said members having its side faces rounded, and;

(f) a locking means comprising a locking ring having a concave skirt in engagement with the ball in opposition to the socket, said locking ring being freely connected to the socket at one side of the ring, and a locking member secured to the socket at the other side of the ring, and freely connected to the other side of the ring, a cam pivoted on said member and having a nose engageable with the end of the locking ring remote from the ball, and means for rotating the cam to retract its nose from the locking ring to enable the upper column section to be flexed relative to the lower column section against the resistance of said spring means (e) and to forcibly engage the cam nose with the locking ring for clamping the locking ring skirt, the ball, and the socket together to preclude flexing of the upper column section relative to the lower column section, said spring means comprising a coil spring circumposed on the upper column section, said locking ring having an annular recess facing said spring, said spring having one end seated in said recess and another end, a tension adjusting nut threaded on the upper column section and compressing the spring against the locking ring, and a resilient and stretchable boot circumposed on the spring and secured at related ends to the nut and the locking ring.

References Cited by the Examiner
UNITED STATES PATENTS

| | | | |
|---|---|---|---|
| 599,058 | 2/98 | Gadd. | |
| 748,252 | 12/03 | Anderson | 74—493 |
| 1,119,572 | 12/14 | Butler | 64—2 |
| 1,322,474 | 11/19 | Allen. | |
| 1,710,399 | 4/29 | Banning | 74—493 X |
| 2,770,981 | 11/56 | Fieber | 74—493 |

BROUGHTON G. DURHAM, *Primary Examiner.*

MILTON KAUFMAN, *Examiner.*